Figure 3:
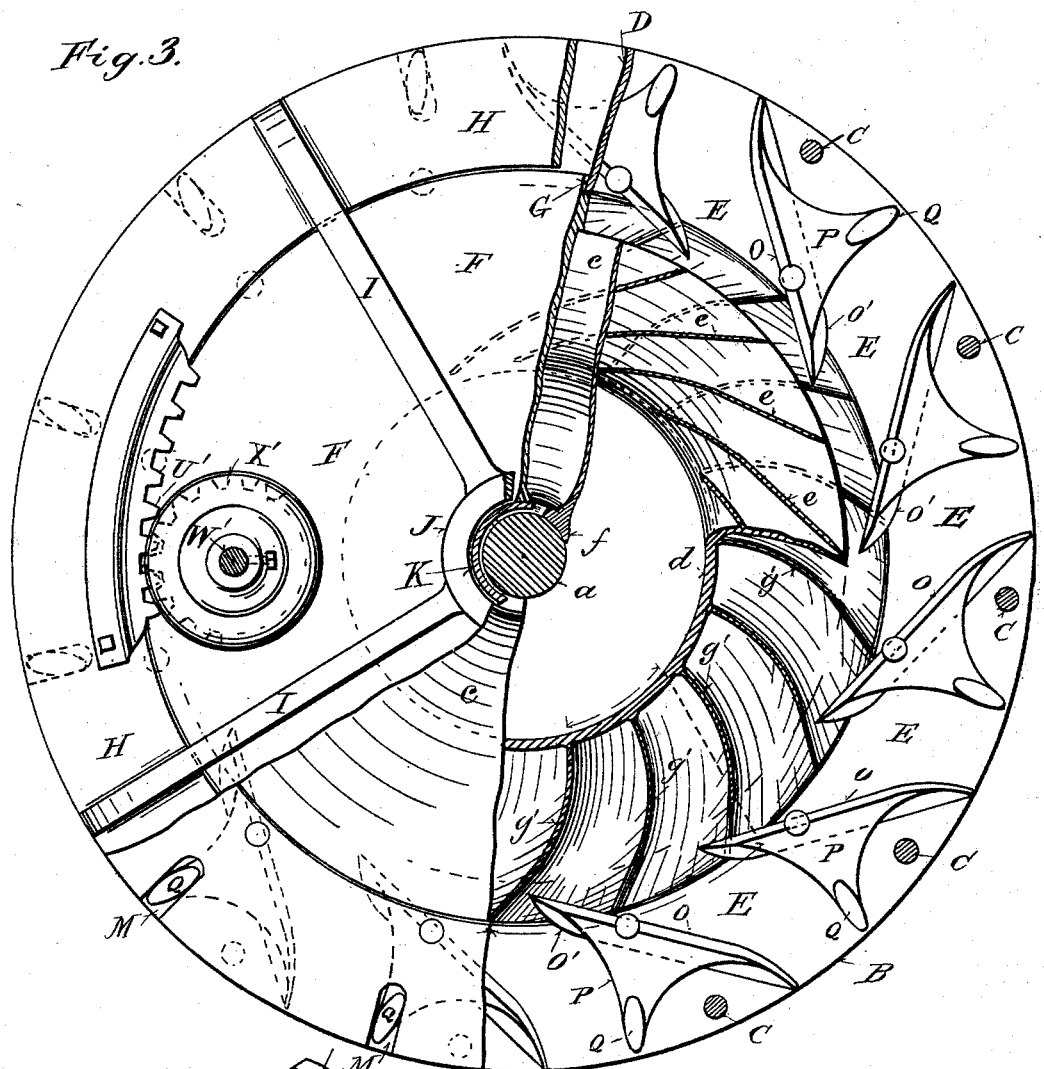

(No Model.) 5 Sheets—Sheet 1.
F. M. BOOKWALTER & W. W. TYLER.
WATER WHEEL.
No. 483,133. Patented Sept. 27, 1892.
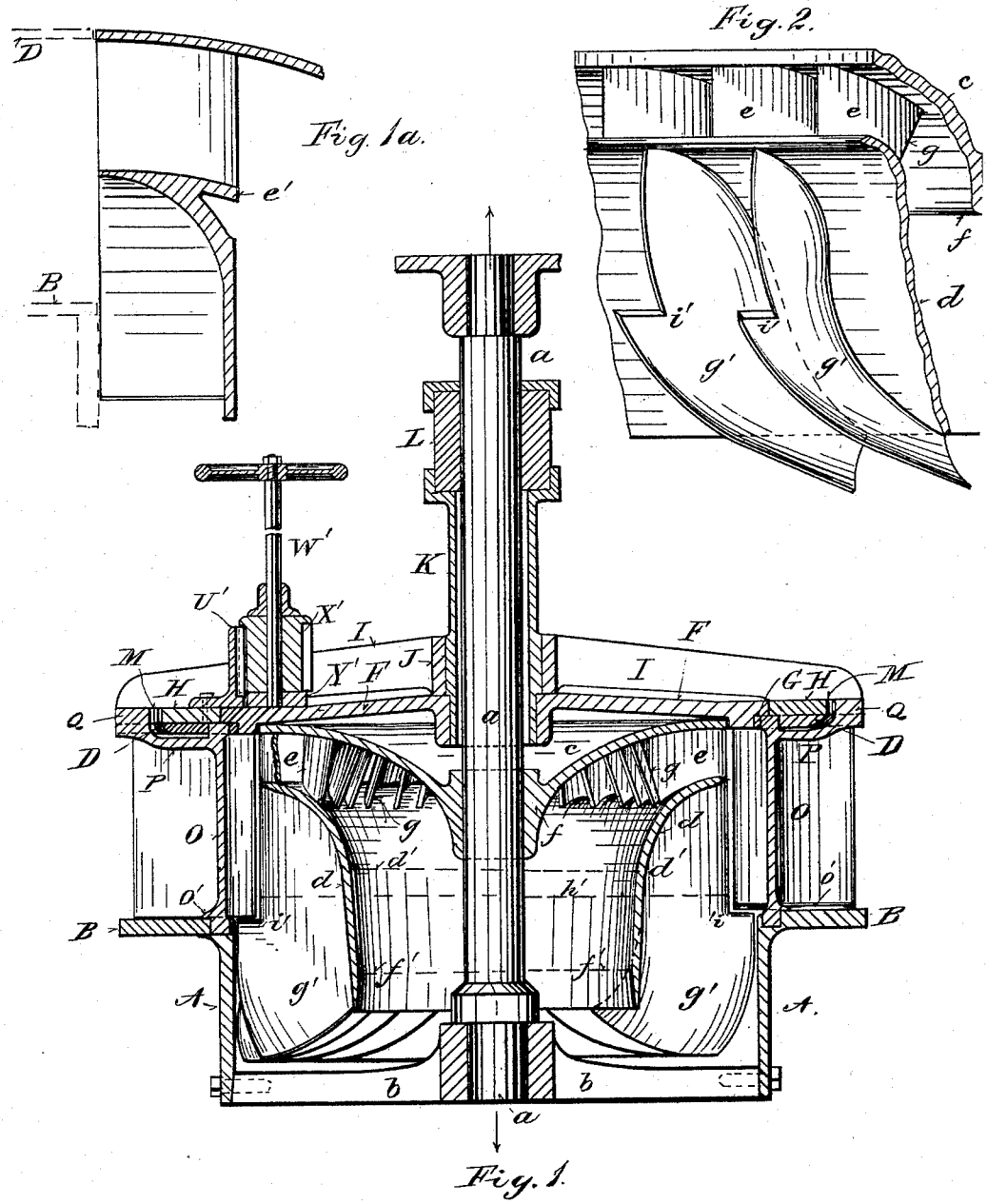
WITNESSES
H. M. Plaisted.
John E. Fenwick.
INVENTORS,
Francis M. Bookwalter,
William W. Tyler.
By H. A. Toulmin,
Their Attorney.

(No Model.) 5 Sheets—Sheet 2.

F. M. BOOKWALTER & W. W. TYLER.
WATER WHEEL.

No. 483,133. Patented Sept. 27, 1892.

WITNESSES
H. M. Plaisted.
John E. Finuck.

INVENTORS
Francis M. Bookwalter,
William W. Tyler,
By H. A. Toulmin
their Attorney.

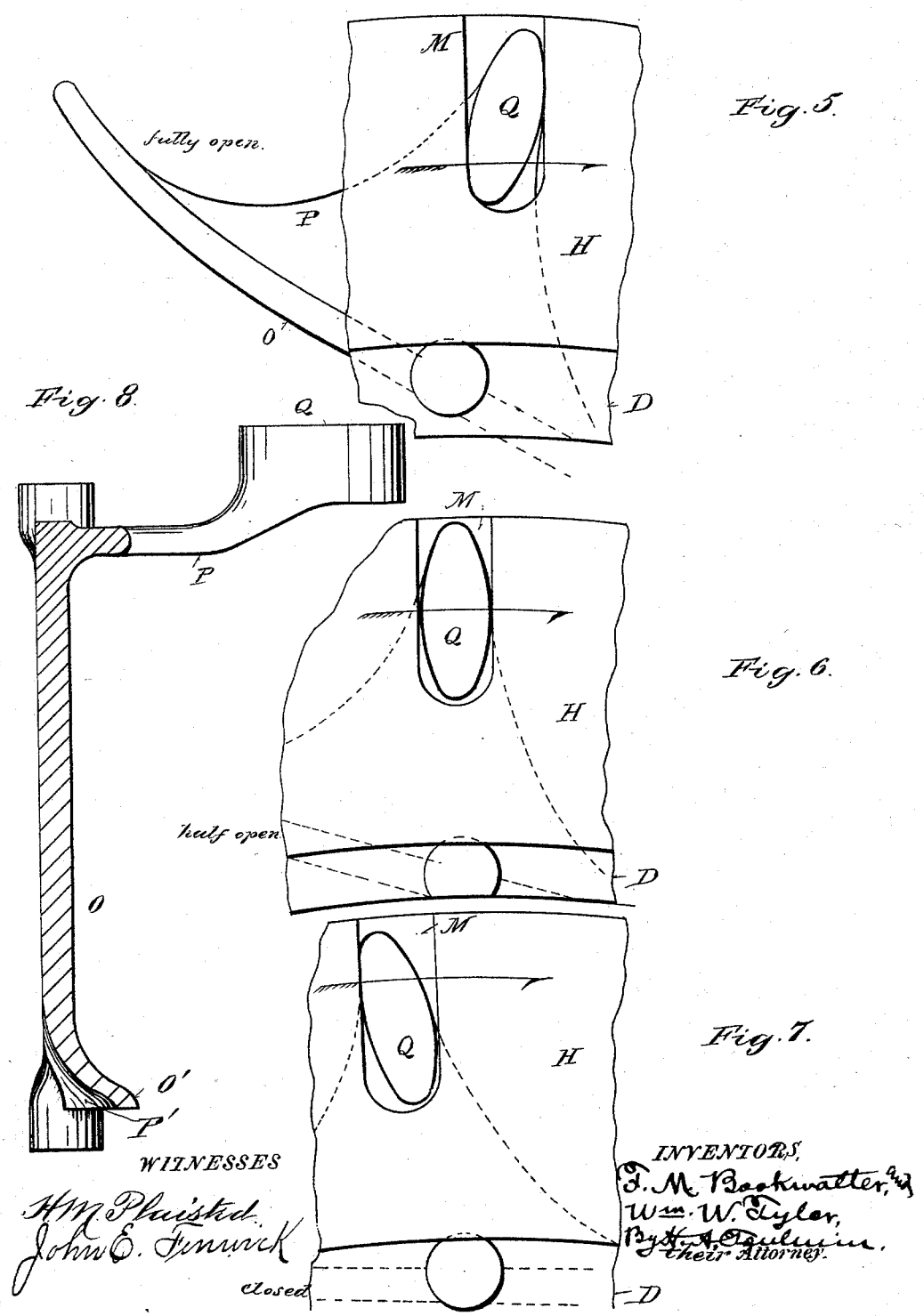

(No Model.) 5 Sheets—Sheet 4.

F. M. BOOKWALTER & W. W. TYLER.
WATER WHEEL.

No. 483,133. Patented Sept. 27, 1892.

WITNESSES
H. M. Plaisted.
John E. Fenwick.

INVENTORS,
Francis M. Bookwalter
William W. Tyler
By H. A. Toulmin
Their Attorney.

(No Model.) 5 Sheets—Sheet 5.

F. M. BOOKWALTER & W. W. TYLER.
WATER WHEEL.

No. 483,133. Patented Sept. 27, 1892.

*Fig. 12.*

WITNESSES
H. M. Plaisted.
John E. Fenwick

INVENTORS,
Francis M. Bookwalter,
and William W. Tyler,
By K. A. _____
Their Attorney.

UNITED STATES PATENT OFFICE.

FRANCIS M. BOOKWALTER AND WILLIAM W. TYLER, OF SPRINGFIELD, OHIO; SAID TYLER ASSIGNOR TO SAID BOOKWALTER.

WATER-WHEEL.

SPECIFICATION forming part of Letters Patent No. 483,133, dated September 27, 1892.

Application filed April 13, 1891. Serial No. 388,635. (No model.)

*To all whom it may concern:*

Be it known that we, FRANCIS M. BOOKWALTER and WILLIAM W. TYLER, citizens of the United States, residing at Springfield, in the county of Clark and State of Ohio, have invented certain new and useful Improvements in Water-Wheels, of which the following is a specification, reference being had therein to the accompanying drawings.

This invention relates to certain new and useful improvements in water-wheels of the class known as "turbines."

Our improvements have reference to various features of the runner or wheel proper, as will be hereinafter detailed, among the essential features of the wheel being the provision of two diameters thereof for the purpose of making the central-discharge buckets thereof and the downward-discharge buckets thereof run or tend to run at substantially equal speeds, notwithstanding the fact that the nature of the central-discharge buckets is to run at less speed than downward-discharge buckets. Our provision of two diameters overcomes this difference in speeds in the manner hereinafter described; also, among the essential features of our wheel is the provision of making the outer or entering ends of the walls of both sets of buckets at the same angle to a radial line drawn across the entering edge of the buckets, whereby the entering ends of the buckets will be practically parallel to the path of the entering water as directed by the gates, the advantages of which are that the wheel will run faster and give more power, because such position of the walls of the buckets will prevent them from dragging the water, while if the angle of the bucket-walls to the radial line in one set of buckets were different from the angle of the bucket-walls to the radial line in the other set of buckets one set would tend to run slower than the other set, resulting in preventing either one or both of the sets of buckets from running at the speed which gives the best economy in the consumption of water.

Our improvements also have reference to constructing the gates with a lip on one side to prevent the water from dropping down in the wheel before it has acquired its proper velocity in passing between the points of the gates and with a curved-out or recessed corner on the side opposite to the lip to turn the water downward in the direction it should go to reach the wheel without delay.

Our improvements, further, have reference to means for actuating the ring or annulus with which the gate-arms are connected, the characteristic of such means being that through them the initial opening of the gates is slow and is done with maximum leverage, while as the opening proceeds the movement increases and the leverage decreases correspondingly with the decreased resistance offered by the gates as they approach the full-open position.

Our improvements also have reference to a connection between the gate-arms and the operating ring or annulus which has a shifting leverage over the gates, whereby when the gates are at closed position the leverage is maximum, such position offering the greatest resistance, whereby when the gates are half-open the leverage is at the mean, because the resistance is at the mean, and whereby when fully opened the leverage is at the minimum, because the resistance at such position is at the minimum.

Our improvements also have reference to numerous other features, as will be hereinafter described, pointed out, and claimed.

Figure 4:
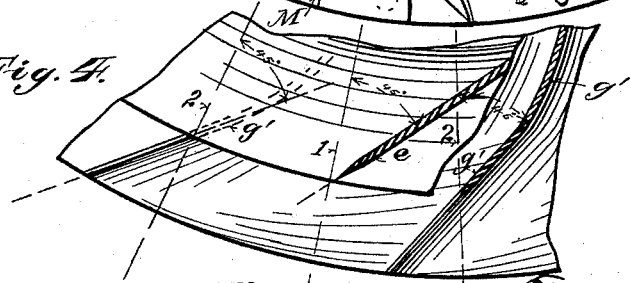
Figures 9, 10, 11:
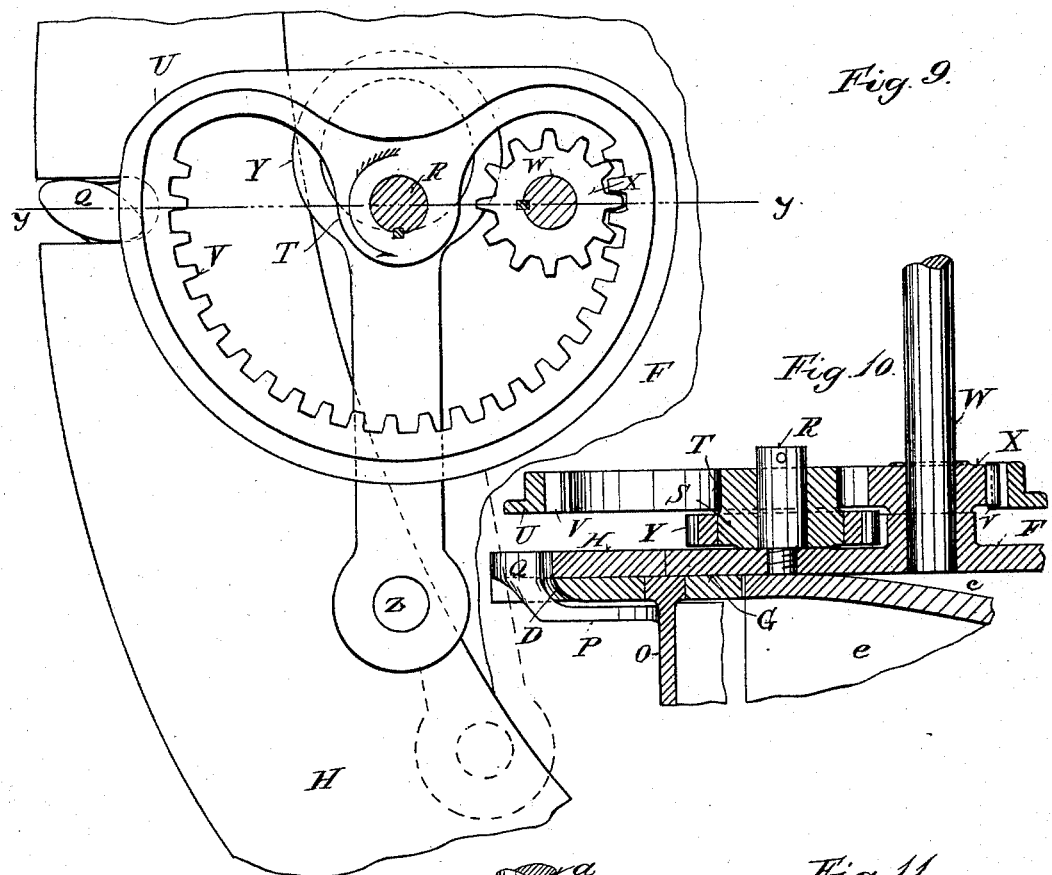

In the accompanying drawings, forming a part of this specification, in which like reference-letters indicate corresponding parts, Figure 1 represents a vertical sectional view of a water-wheel embodying our improvements; Fig. 1ª, a section in detail of an old form; Fig. 2, a detail enlarged view of a fragment of the wheel or runner, more clearly showing the two sets of buckets; Fig. 3, a partial plan and partial horizontal sectional view of the water-wheel; Fig. 4, a detail partial plan and partial sectional view of a portion of the wheel or runner, showing the angle of the bucket-walls to radial lines crossing their outer ends; Fig. 5, a detail view of a gate and a part of its operating-ring, showing the gate fully opened and the leverage at minimum; Fig 6, a similar view of the same parts, showing the gate half-open and the leverage at the mean; Fig. 7, also a similar view of the same parts, showing the gate closed and the leverage at the maximum; Fig. 8, an enlarged detail view of one of the gates in section and in elevation; Fig. 9, a detail view of our means of operating the gate-ring; Fig. 10, a sectional view of the same and the adjacent parts of the structure on the line $y\,y$ of Fig. 9; Fig. 11, a similar view to Fig. 1, showing another form of the wheel or runner as regards the contour or profile of the two diameters; and Fig. 12, a perspective of the wheel alone.

For convenience in making our improvements understood we will describe the apparatus by first referring to the casing or outer structure as distinguished from the runner or wheel proper.

The letter A designates a cylindrical shell or casing of the usual type, except as modified by the inclination of its inner wall A' to agree with the contour or outline of the wheel proper, as shown in Fig. 11. An annular plate B is secured to or cast with the shell A. Upon this plate is mounted a series of posts or columns C, whose function is to support the upper plate D. The plates B and D incidentally form the lower and upper walls of the gate-openings, the side walls being formed by the gates themselves, and the space so closed being termed "chutes," as seen at E in Fig. 3. Upon the plates D is mounted the crown or top F of the casing, the resting-point being at G, where the edge of the top comes down upon the inner part of the plate D.

The letter H designates the ring or annulus, which serves to operate the gates through the mechanism hereinafter described. This ring is secured to arms or spiders I, which have a hub J, that is mounted around the sleeve K, which rests upon the top F and supports a box L, used to maintain the wheel-shaft in position. The hub J also rests upon the top F to avoid friction between the ring H and the plate D.

At intervals agreeing with the positions of the gate-arms the ring H is slotted, as seen at M in Figs. 1, 3, 5, 6, and 7. These slots receive the gate-arms. The gates are designated O and are provided with suitable pivots, which turn in bearings in the plates B and D. Each gate has an arm P, extending outward and preferably curved upward and terminating in a stud or head Q, whose outline, viewed from above, is substantially elliptical. The minor diameter of these studs is such as to fit the width of the slots M. When the ring H is rotated to open or close the gates, the walls of the slots M work against the walls of the studs Q, and thus move the arms and oscillate the gates. As the arms oscillate on the gate-pivots the point of contact between the studs and the slot-walls shifts or changes in a radial direction and transfers from one side of the slot and stud to the other side, according to the direction of movement of the ring H. This radial shifting of the point of contact shifts or varies the leverage of the ring over the gates.

It is known that the position of the gates when closed subjects them to the greatest amount of resistance by the water-pressure when it is attempted to open the gates. Therefore we have provided for the maximum leverage over the gates when in such position. This is illustrated in Fig. 7, wherein the point of contact between the slot-wall and the stud is at the greatest distance from the point of oscillation of the gates.

It is also known that when the gates are about half-open the water-pressure upon them is about half the pressure they are subjected to when closed. We have therefore provided for a mean leverage over the gates at the time they are subject to mean resistance. This is illustrated in Fig. 6, wherein the contact between the slot-wall and the stud is at the intermediate point of the several places of contact.

It is further known that when the gates stand fully or wide open they are subjected to the least resistance by the water-pressure. For this reason we have provided for the minimum leverage of the ring over the gates when the gates are in such position. This is illustrated in Fig. 5, wherein the contact between the slot-wall and the stud is at the minimum distance from the point of oscillation.

Referring now to the mechanism for operating the ring H, the letter R designates a pin mounted on the top F and carrying an eccentric S, with whose sleeve T is connected or cast a segment U, having internal gear-teeth V. The hand-shaft W is also mounted in the top F and provided with a hand-wheel and a pinion X, which meshes with the teeth V. By operating the pinion the segment and its eccentric are rotated about the pin R. On the eccentric is mounted a pitman Y, whose other end connects with the ring H by a pin Z. It will be noticed that the position of the eccentric is such that its first movement is slow and effected with the greatest leverage, and that as the movement proceeds it increases in speed by reason of the throw of the eccentric, but diminishes in leverage. Thus when the gates are closed and the greatest leverage required to open them the ring is rotated slowly through the slow movement of the pitman while the lever-action is greatest, because the eccentric is operating through a short arm. Thus, also, as the movement proceeds and the gates open wider and wider the movement increases and the leverage decreases with the decreased resistance, due to such approach of the gates to the fully-opened position.

Referring again to the gates O, it will be seen that they are provided with a lip or flange O' at one side and with a correspondingly-deflected or curved-out portion P' opposite to the lip. The function of this lip is to prevent the water from dropping down into the lower buckets of the wheel before it has acquired its proper velocity in passing between the points of the gates, and the function of the curved-out part of the gates is to turn the water downward in the direction it should go to reach the lower buckets without delay. This will be understood by referring to Fig. 3, from which it will be seen that as the water passes through the chutes to the buckets it will reach the lips O' of the gates before it will reach the curved-out portions P'. This is so because of the angular direction of the chute, whereby the lips O' are reached by the water before it gets as far as the curved-out portion of the next gate, which is farther inward, passing in the general direction of the chute and following the curve of the wheel-periphery. Therefore it is desired to prevent the early dropping of the water at the side of the gates which is first reached and to facilitate the immediate dropping of the water at that side of the gates which is reached latest.

In Figs. 1 and 3 we have shown another plan of operating the ring H, the same consisting of a pinion X', mounted on a hand-shaft W', having a bearing in a block Y', carried by the top F and meshing with a rack U', secured to the ring H. This is a common expedient and is merely shown for the purpose of illustrating the fact that our improved shifting leverage connection between the gate-arms and the operating-ring does not depend upon the form of operating means shown in Figs. 9 and 10, nor upon any particular form of operating mechanism.

Referring now to the wheel proper, we would observe that it is carried by the usual central shaft or arbor $a$, stepped in a spider $b$. This wheel is composed of a depressed dome or crown-plate $c$ and a body or shell $d$. This crown-plate and this body or shell occupy the relation shown in Fig. 1. They are preferably made in one piece, being connected together by the walls $e$, which constitute, in connection with the crown-plate and the shell or body, the upper set of buckets. The crown-plate terminates at its center in a hub $f$, which is fitted upon and firmly secured to the arbor $a$. The walls $e$ extend a proper distance within the space between the crown-plate and the shell or body and terminate at their inner ends in a slightly-inclined position, as shown at $g$. This inclined termination of the walls, which for the sake of convenience we will call the "termination of discharge ends of the upper buckets," is approximately perpendicular to the line of movement of the water as it discharges from such ends of the buckets. The function and purpose of inclining the discharge ends of the buckets is to more readily turn the centrally-discharging water downward into the space between the crown-plate and the body or shell, through which it finally passes out. This turning or assisting in turning of the centrally-discharging water downward as it leaves the discharge ends of the upper buckets renders its exit freer and causes or enables the water to follow the general course of the body or shell $d$. It will also be noticed that the space between the crown-plate and the body or shell increases in depth or measurement from the entering ends of the upper buckets toward, to, and beyond the discharge ends of the upper buckets. This makes the depth of the upper buckets deeper as they proceed inward and results in rendering the discharge of the water freer. It will also be observed that the body or shell $d$ presents a continuous and unbroken curve from its upper end down to about the point $d'$. This also gives a freer outlet to the water, and also affords a greater depth at the discharge ends of the upper buckets than if the shell or body were formed with the ledge or projection $e'$, (shown in the small view, Fig. 1ª, above Fig. 1,) which is usual in water-wheels having an upper and a lower series of buckets. Our object is to dispense with this ledge or projection and to form a continuous and unbroken curve between the entering ends of the upper buckets and some suitable point below.

The next peculiar feature of our improved wheel is that the body or shell $d$, from about the point $d'$, or where the curve terminates, contracts or draws inward toward and to the lower end of the shell or body. The object of this form is to increase the radial measurement of the lower series of buckets in their lower portion, such body or shell forming the inner or back wall of these lower buckets. This wall so receding and enlarging the lower area (in a radial direction) of the lower part of the lower buckets increases the discharge area thereof, while it also presents a wall or surface whose direction more nearly follows the course of the discharging water coming down from the upper buckets. This centrally inclining or contracting of the lower part of the body or shell $d$ aids in carrying out two objects—namely, the freer discharge of the water downward through a part or portion of all the lower buckets and the provision of a wall approaching in direction the course taken by the discharge-water from the upper buckets while it is yet within the body of the wheel. By preference the inside of the body or shell is beveled from its lower end, say, to the points designated $f'$, whereby the water from the upper buckets, after getting under the control of the body or shell, is permitted to pass out with increased freedom.

Referring now to the lower buckets, they are constituted of a series of walls or partitions $g'$, secured to or cast with the body or shell $d$, extending down somewhat below the shell, and curved backward, particularly at their lower outer portion, to form the proper contour to be driven by the downward-discharging water, which at the time of leaving the buckets should fall with all movement spent save the mere dropping down. The direction of the walls $g'$ and $e$ with respect to a radial line passing from the center of the wheel as the basis of comparison will be hereinafter referred to. It will be observed that the lower buckets commence at their upper ends a distance equal to about two-thirds of the height of the gates.

In the well-known Leffel wheel the depth of the upper buckets and the depth of the lower buckets are about equal above the plate B. We depart from this relative depth by elevating the shell or body $d$, as above indicated. This arrangement assists in giving to the shell or body $d$ the desired curve or sweep hereinbefore referred to, and also permits of extending the shell or body so far toward the center as to more equally divide the space from the center to the periphery, as suggested, along the line $h'$, so that the outer and lower buckets can be of greater dimensions radially, measured from their outer edge inward. Heretofore in the wheel above referred to the lower position of the upper end of the shell or body has diminished such measurement of the lower buckets, because such position brought the remainder of the body or shell farther from the center in maintaining the proper curvature and shape for properly directing and liberating the water from both sets of buckets. Thus the practical value of this elevated location of the upper edge of the shell or body and the consequent location nearer the center of the remaining portion of the body or shell than heretofore possible under the former construction will be appreciated. It will also be observed that this elevated position of the upper end of the shell or body $d$ increases the depth of the entering end of the lower or outer buckets. Thus the increased capacity of such lower buckets to freely discharge the water is accompanied by a proportionate increased capacity of inlet to such buckets. These characteristics of these lower buckets enable them to develop more power, because they are thus endowed with increased capacity, and this is true, although the diameter of the wheel is not increased to secure these ends. They flow from the elevated position of the upper end of the shell $d$, whereby the depth of the entering ends of such lower buckets is increased, and whereby the radial measurement of the lower portion of these buckets is increased. We lay special stress upon these features of these buckets so brought into a wheel having two sets of buckets. Of course the differential diameter of the wheel, wherein the lower portion is larger than the upper portion, assists in increasing the radial dimension of the lower portion of the lower buckets; but aside from this the characteristics just above referred to are inherent in such buckets because of the peculiar position of the shell $d$.

Referring now to the differential diameter or form of the outline of our improved wheel, attention is called to Figs. 1 and 11. From each it will be seen that the lower part of the wheel is larger than the upper part. In Fig. 1 an abrupt shoulder or jog $i'$ occurs where the two diameters change and the remaining lower portion of the wheel is practically vertical. In Fig. 11 the juncture of the two diameters is marked by a shoulder or jog of less width or of no perceptible width whatever, and the remaining lower portion of the wheel is inclined outward as it proceeds downward. Both forms are valuable and produce good results in practice. The object in making the two diameters is to cause the central-discharge buckets to run at even speed with the downward-discharge buckets. This wheel embodies the upper central-discharge buckets and the downward-discharge buckets. It is well known in the science of water-wheels that central-discharge buckets run at less speed than downward-discharge buckets. Therefore to unite in one wheel these two characters of buckets having these two fundamental characteristics—differential speeds—is a problem to which we have directed our study and experiments. By providing the differential diameters and assigning to the natural slower-speed type of buckets—namely, the central-discharge buckets—the smaller diameter and by assigning to the natural higher-speed buckets—namely, the downward-discharge buckets—the larger diameter we have overcome the differential speed effects inherent in the two types of buckets. We apply the motive force in the slower kind of buckets at a point nearer the center of the wheel, so as to increase or accelerate the effect upon the wheel, and we apply the motive force to the faster kind of buckets more remote from the center of the wheel and decrease or lessen the speed effects. Thus we unite in one wheel the two types of buckets and realize an even speed from them. We wish to be understood as laying broad claim to the discovery and application of this principle or mode of operation.

Referring now to another peculiarity of our improved wheel, attention is called to Figs. 3 and 4. Because of the greater velocity of the circumference of the wheel than the entering water, as is well known in the science of water-wheels, the water will enter the wheel, relatively to the wheel, at an angle of about forty-five to fifty degrees to a radial line. We have therefore devised a position for the walls which constitute the sides of the lower and upper buckets of our wheel which will act to split or divide the water rushing into the buckets, and will prevent the buckets from dragging the water. This position or arrangement consists in making the entering ends of the bucket-walls of the lower buckets and of the upper buckets, respectively, at an angle of about forty-five degrees to a radial line proceeding from the center of the wheel outward to the extreme entering or outer edge of the dividing-walls. This does not make the walls parallel with each other, but gives each wall the proper angle or direction with respect to the line of travel or in-rush of the water at the place on the periphery where such wall is located. The result is that the water is cleaved or divided by the entering edges of the bucket-walls as distinguished from the objectionable operation of allowing the walls to impinge against and drag or force the water along, thus interfering with the velocity of the wheel, and consequently reducing the efficiency of the wheel.

Referring to Fig. 4 it will be seen that the upper wall e is at an angle of forty-five degrees to the radial line 1, and that the walls g' are at the same angle to their radial line 2 for a short distance from their entering edges inward. The length of that part of the walls e and g' which is at such angle will vary with the diameter of the wheels or other conditions and should be at least from one-fourth to five-eighths of an inch. Inward of this the direction or contour of these walls may be varied to suit the inclination of the builder and the purposes and local conditions under which the wheel is to be used; but the contours and direction shown are recommended as the preferred ones.

Among the advantages of the direction or location of the entering edges of the buckets here described may be mentioned the increased speed and power of the wheel, because such buckets do not drag the water. Moreover, when the buckets are at different angles to the radial line one set of buckets will tend to run slower than the other set, resulting in either one or both of the sets failing to run at the speed which gives the best economy in the consumption of water, so that by our arrangement, besides increasing the speed and power, we maintain the proper speed to economize in the use of water.

Referring again to the differential diameter of the wheel, we would observe that by reason of this construction the gates may be swung farther inward when it is wished to flood the wheel, when an ample supply of water is to be had. Moreover, by this construction the points or inner ends of the gates when adjusted to give the best per cent. of economy of water will be about over the periphery of the larger diameter of the wheel—a preferred position. When the form of two diameters shown in Fig. 1 is used, the wheel proper may be lifted out of the casing by removing the spider I and the top plate F. When the form of two diameters shown in Fig. 11 is used, the wheel proper is removable from the lower end of the casing by removing the step-spider b. It will be observed that the discharge ends of the upper buckets terminate remote from the main shaft, and that within the circle formed by such inner ends there is an annular space through which the spent water discharges. By terminating the discharge ends of these upper buckets remote from the main shaft the water is discharged from the upper buckets at places remote from said shaft, instead of being conducted to or near to the shaft, as would be the case if the buckets proceeded inward to or near to it and then discharged the water. A material difference in result produced by the two constructions, among other differences, is that by so terminating the discharge ends of the upper buckets a larger quantity of water can be discharged from them, whereby there is obtained a higher velocity of the wheel and a greater efficiency of developed power by the wheel, so that this arrangement of the upper buckets with respect to the main shaft is of importance and is a material feature of our wheel. We would also observe that by so increasing the quantity of water that can be discharged from the upper buckets and increasing the capacity of the entering end of the lower buckets, as hereinbefore described, we get in one wheel two increased capacities, uniting in a marked increased efficiency of the wheel.

We have observed hereinbefore that the lower portion of the shell or body d is approximately equidistant between the center and periphery of the larger diameter of the wheel. We have also stated that such portion of the shell or body slightly inclines or contracts inward as it proceeds downward. That the two statements may not seem in any way to conflict we would further state that while the shell or body is so inclined or contracted or tapered still its general location in the lower portion is substantially equidistant between the two points named.

Having thus fully described our invention, what we claim as new, and desire to secure by Letters Patent, is—

1. A water-wheel having an upper set of buckets and a lower set of buckets, the diameter of the lower part of the wheel being greater than that of the upper part of the wheel.

2. A water-wheel having an upper set of central-discharge buckets and a lower set of downward-discharge buckets, the lower diameter of the wheel being larger than the upper diameter of the wheel.

3. A water-wheel having a set of slow-operating buckets and a set of faster-operating buckets and constructed with two diameters, the slow-operating buckets being in the smaller diameter and the faster-operating buckets being in the larger diameter.

4. A water-wheel having a crown-plate and a shell or body with a space between them which increases in size from the upper end inward, a set of central-discharge buckets in said space, and a set of downward-discharge buckets outside of said shell or body, the wheel being of two diameters.

5. A water-wheel having a crown and a shell or body with a space between them which widens inward from the outer entrance end, a set of central-discharge buckets in said space and a set of downward-discharge buckets outside of the body or shell, the said body or shell being located in the lower portion substantially equidistant from the center of the wheel to the periphery thereof, the walls constituting both sets of buckets lying in their outer portion at an angle to a radial line drawn from the center of the wheel to said outer portion, the said angle of the bucket-walls increasing the capacity of the buckets to take in water and the said widening of the space between the shell and body increasing the discharge capacity of the upper set of buckets, and the said location of the lower part of the shell or body increasing the radial depth of the lower buckets to increase their discharge-capacity.

6. In a water-wheel, the combination, with a case and pivoted oscillating gates mounted therein, the pivots of the gates being outside of their inner ends, thereby leaving the inner portion of the gates capable of movement in and out to and from the periphery of the wheel opposite to such inner ends of the gates, of the wheel proper mounted in said case and having two diameters, the inner ends of the gates being adapted to extend over the larger diameter of the wheel when said inner ends are adjusted inward.

7. A water-wheel having a curved crown and a body or shell continuously curved from its upper end downward and inward through a portion of its length, with the remainder thereof located substantially equidistant from the center to the periphery, central-discharge buckets in the space between the crown and the shell or body, whose inner ends terminate remote from the main shaft, and downward-discharge buckets outside of the shell or body whose radial measurement is increased by reason of said position of the shell or body.

8. A water-wheel having a set of central-discharge buckets and also a set of downward-discharge buckets, the respective entering edges of each set of buckets being at the same angle to a radial line running from the center of the wheel to said entering edges.

9. A water-wheel having a set of central-discharge buckets and also a set of downward-discharge buckets, the respective entering edges of both sets of buckets being at an angle of forty-five degrees to a radial line drawn from the center of the wheel to the said entering edges.

10. A water-wheel having a set of central-discharge buckets and a set of downward-discharge buckets, the respective entering edges of each set of buckets being at the same angle to a radial line drawn from the center to said entering edges and the lower diameter of the wheel larger than the upper diameter.

11. A water-wheel having two sets of buckets and two diameters, the part consisting of the larger diameter being contracted from the lower end upward.

12. A water-wheel having an upper set of buckets and a lower set of buckets, with a crown over the upper set and a body or shell between the two sets, the upper end of the body or shell being nearer to the crown than to the place on the lower set opposite to which stands the lower end of the gate when the wheel is mounted, the lower part of the remainder of the shell being located substantially equidistant from the center of the wheel to the periphery, whereby the entering end of the lower set of buckets is increased and whereby the radial measurement of the lower buckets is increased.

13. In a water-wheel, the combination, with the case and oscillating gates mounted therein, the inner ends of the gates being deflected on one side and extended on the other to form a lip, of a wheel proper mounted in the case and having two diameters, the inner ends of said gates being adapted to be adjusted inward over the larger diameter, the deflected part to permit the water to drop downward and the extended part to support the water, for the purpose set forth.

14. In a water-wheel, the combination, with the case, of oscillating gates mounted therein, and an operating ring or annulus and means to operate it, arms carried by the gates and having studs and engaging with a ring through a shifting bearing to vary the leverage, for the purpose set forth.

15. In a water-wheel, the combination, with the case, of oscillating gates mounted therein, and an operating ring or annulus, and a shifting or traveling bearing between the gates and said ring or annulus to vary the leverage of the ring over the gates, and means to operate the ring or annulus.

16. In a water-wheel, the combination, with the case and gates pivoted within it and each having an arm provided with a stud substantially of the form described, of a ring having slots to receive said studs and between which there is a readily-shifting contact, and means to actuate the ring.

17. A water-wheel having an upper set of buckets whose inner ends terminate remote from the main shaft and a lower set of buckets with a crown over the upper set and a body or shell between the two sets, the upper end of the body or shell being nearer to the crown than to the place on the lower set opposite to which stands the lower end of the gate when the wheel is mounted and the remainder of the shell located substantially equidistant from the center to the periphery, whereby the entering end of the lower set of buckets is increased, and whereby the radial measurement of the lower portion of the lower buckets is increased.

18. A water-wheel having a crown and a shell or body, the body having a continuous curve from its upper end inward, buckets located between the crown and the shell, their discharge ends inclined and terminating remote from the shaft, whereby they become central-discharge buckets, and downward-discharge buckets located outside and around the lower part of the shell or body.

19. A water-wheel having an upper set of buckets and a lower set of buckets, with a crown over the upper set and a body or shell between the two sets, the upper end of the body or shell being nearer to the crown than the place on the lower set opposite to which stands the lower end of the gates when the wheel is mounted, the portion of the wheel below the lower end of the gates being of greater diameter than the remainder of the wheel.

In testimony whereof we affix our signatures in presence of two witnesses.

FRANCIS M. BOOKWALTER.
WILLIAM W. TYLER.

Witnesses:
H. M. PLAISTED,
OLIVER H. MILLER.